United States Patent
Knaupp et al.

(10) Patent No.: US 10,940,647 B2
(45) Date of Patent: Mar. 9, 2021

(54) METHOD AND DEVICE FOR PRODUCING A FIBER-REINFORCED SEMI-FINISHED PLATE BY ULTRASONIC WELDING

(71) Applicant: Covestro Deutschland AG, Leverkusen (DE)

(72) Inventors: Mattias Knaupp, Langenfeld (DE); Thomas Grimm, Cologne (DE); Henning Börger, Markt Erlbach (DE)

(73) Assignee: COVESTRO DEUTSCHLAND AG, Leverkusen (DE)

(*) Notice: Subject to any disclaimer, the term of this patent is extended or adjusted under 35 U.S.C. 154(b) by 270 days.

(21) Appl. No.: 16/070,716

(22) PCT Filed: Dec. 14, 2016

(86) PCT No.: PCT/EP2016/080870
§ 371 (c)(1),
(2) Date: Jul. 17, 2018

(87) PCT Pub. No.: WO2017/102773
PCT Pub. Date: Jun. 22, 2017

(65) Prior Publication Data
US 2019/0022957 A1    Jan. 24, 2019

(30) Foreign Application Priority Data
Dec. 17, 2015 (EP) .................................. 15200643
Dec. 17, 2015 (EP) .................................. 15200659
(Continued)

(51) Int. Cl.
*B32B 37/00* (2006.01)
*B29C 70/20* (2006.01)
(Continued)

(52) U.S. Cl.
CPC ............ *B29C 70/20* (2013.01); *B29C 65/087* (2013.01); *B29C 65/7894* (2013.01);
(Continued)

(58) Field of Classification Search
USPC ........................................................ 156/73.1
See application file for complete search history.

(56) References Cited

U.S. PATENT DOCUMENTS

| | | | | |
|---|---|---|---|---|
| 5,059,277 A | * | 10/1991 | Willhite, Jr. ...... | A61F 13/15699 156/580.1 |
| 6,432,236 B1 | * | 8/2002 | Leemon ................. | B29C 65/08 156/73.1 |
| 2008/0023130 A1 | | 1/2008 | Gomez et al. | |

FOREIGN PATENT DOCUMENTS

| | | |
|---|---|---|
| EP | 2439054 A1 | 4/2012 |
| WO | WO 2015/017570 A1 | 2/2015 |

OTHER PUBLICATIONS

International Search Report for PCT/EP2016/080870, dated Apr. 19, 2017. (English translation attached).
(Continued)

*Primary Examiner* — James D Sells
(74) *Attorney, Agent, or Firm* — K&L Gates LLP (57) ABSTRACT

The present invention provides a continuous method for producing a fiber-reinforced semi-finished plate. The present invention also provides a device for carrying out the continuous method for producing a fiber-reinforced semi-finished plate. The present invention provides the fiber-reinforced semi-finished plate.

3 Claims, 4 Drawing Sheets

(30) Foreign Application Priority Data

Feb. 22, 2016 (EP) .................................... 16156688
Apr. 5, 2016 (EP) .................................... 16163840

(51) Int. Cl.
*B29C 70/30* (2006.01)
*B29C 65/08* (2006.01)
*B29C 65/78* (2006.01)
*B29C 65/00* (2006.01)

(52) U.S. Cl.
CPC .......... *B29C 66/1122* (2013.01); *B29C 66/45* (2013.01); *B29C 66/721* (2013.01); *B29C 66/7212* (2013.01); *B29C 66/73921* (2013.01); *B29C 66/81463* (2013.01); *B29C 66/81467* (2013.01); *B29C 66/81469* (2013.01); *B29C 66/83411* (2013.01); *B29C 66/83413* (2013.01); *B29C 70/30* (2013.01)

(56) References Cited

OTHER PUBLICATIONS

Written Opinion of the International Searching Authority for PCT/EP2016/080870, dated Apr. 19, 2017. (English translation attached).
International Preliminary Report on Patentability for PCT/EP2016/080870 dated Jun. 19, 2018.

\* cited by examiner

Fig. 4

METHOD AND DEVICE FOR PRODUCING A FIBER-REINFORCED SEMI-FINISHED PLATE BY ULTRASONIC WELDING

CROSS-REFERENCE TO RELATED APPLICATIONS

This application is a U.S. national stage application, filed under 35 U.S.C. § 371, of International Application No. PCT/EP2016/080870, which was filed on Dec. 14, 2016, and which claims priority to European Patent Application No. 15200643.3, which was filed on Dec. 17, 2015, European Patent Application No. 15200659.9, which was filed on Dec. 17, 2015, European Patent Application No. 16156688.0, which was filed on Feb. 22, 2016, and European Patent Application No. 16163840.8, which was filed on Apr. 5, 2016, and the contents of each are incorporated by reference into this specification.

FIELD

The present invention provides a continuous process for producing a fiber-reinforced semifinished panel. The present invention also provides an apparatus for performing the continuous process for producing a fiber-reinforced semi-finished panel. The present invention further provides the fiber-reinforced semifinished panel.

BACKGROUND

The use of fibre-reinforced materials has steadily increased in the last decades on account of their outstanding specific properties. Fibre-reinforced materials are employed in structures subject to acceleration in particular, in order to allow weight reduction and thus minimize energy consumption without incurring a loss of strength or stiffness of the material.

A fibre-reinforced material, also known as fibre composite or composite for short, is an at least biphasic material consisting of a matrix material in which fibres are substantially completely embedded and encased. The matrix has a shape-conferring function, is intended to protect the fibres from external influences and is necessary to transfer forces between the fibres and to introduce external loads. The fibres make a decisive contribution to the mechanical performance of the material, with glass, carbon, polymer, basalt or natural fibres often being employed in industry. Depending on the intended use, matrix materials employed are generally thermosetting or thermoplastic polymers, occasionally even elastomers.

Thermosetting polymers are already long established in a great many industries. However, a decisive disadvantage is the lengthy curing time which leads to correspondingly lengthy cycle times during processing to afford components. This makes thermoset-based composites unattractive especially for high-volume industry applications. By contrast, thermoplastic-based composites, provided they are in the form of already fully-consolidated semifinished products, are, for example, often merely heated, formed and cooled when subjected to further processing, which may nowadays be achieved in cycle times of well under one minute. The processing may also be combined with further process steps, for example insert-moulding with thermoplastics, which makes it possible to achieve a very high degree of automation and integration of functions.

Reinforcing materials used are essentially semifinished textiles such as wovens, multi-ply laids or nonwovens (e.g. batts, random-laid fibre mats etc). It is a characteristic of these forms of fibre reinforcement that the alignment of the fibre—and thus the force paths in the subsequent component—is already determined in the semifinished textiles and can no longer be changed afterwards. While this does allow direct production of a multidirectionally reinforced composite it has disadvantages in terms of flexibility of ply construction, mechanical properties—such as stiffness and strength for example—and economy. In thermoplastic-based systems these semifinished textiles are typically impregnated with polymer under the action of pressure and temperature and then cut to size and subjected to further processing as a cured sheet.

In addition to these already established systems based on semifinished textiles, thermoplastic-based fibre-reinforced semifinished panels constructed from a plurality of respectively unidirectionally fiber-reinforced semifinished products arranged with their large surfaces superposed, i.e. "face to face" superposed, are becoming increasingly important. These unidirectionally fiber-reinforced semifinished products are generally in the form of sheetings. The production of such unidirectionally fiber-reinforced semifinished sheetings—also referred to hereinbelow as "tapes" or in the singular as "tape"—is described in EP 2 631 049 A1 for example.

SUMMARY

The invention accordingly provides a:
process for producing a fiber-reinforced semifinished panel comprising the following operations:
(1) unrolling two, three, four, five, six or more unidirectionally fiber-reinforced semifinished products (tapes) from rolls;
(2) joining the tapes to afford a fiber-reinforced semifinished panel sheeting by ultrasonic welding;
(3) cutting the fiber-reinforced semifinished panel from the fiber-reinforced semifinished panel sheeting.

DETAILED DESCRIPTION

Tapes where the matrix material consists to an extent of at least 50 wt %, preferably at least 70 wt %, particularly preferably to an extent of at least 90 wt %, very particularly preferably at least 95 wt %, in particular to an extent of at least 97 wt %, of one or more thermoplastics are preferred. The thermoplastic is preferably selected from one or more of the series comprising polycarbonate, polyamide, polyethylene, polypropylene, polyphenylene sulfone, polyetherimide, a polyether ketone such as polyetheretherketone polyetherketoneketone, polyetheretheretherketone, polyetheretherketoneketone, poly(etherketone-etherketoneketone) and thermoplastic polyurethane. Particular preference is given to the thermoplastic polycarbonate or to a polycarbonate-based thermoplastic.

In the context of the present invention a "polycarbonate-based thermoplastic" is to be understood as meaning a thermoplastic comprising at least 50 wt %, preferably at least 60 wt %, preferably at least 70 wt %, in particular at least 80 wt %, particularly preferably at least 90 wt %, very particularly preferably at least 95 wt %, in particular at least 97 wt %, of polycarbonate. Expressed another way, in the context of the present invention a polycarbonate-based thermoplastic may comprise not more than 50 wt %, preferably not more than 40 wt %, preferably not more than 30 wt %, in particular not more than 20 wt %, particularly preferably not more than 10 wt %, very particularly preferably not more than 5 wt %, in particular not more than 3 wt %, of one or more constituents distinct from polycarbonate as blend partners.

It is preferable when the polycarbonate-based thermoplastic consists substantially, in particular to an extent of 100 wt %, of polycarbonate.

When reference is made here to polycarbonate this also comprehends mixtures of different polycarbonates. Polycarbonate is furthermore used here as an umbrella term and thus comprises both homopolycarbonates and copolycarbonates. The polycarbonates may further be linear or branched in known fashion.

It is preferable when the polycarbonate-based plastic consists to an extent of 70 wt %, 80 wt %, 90 wt % or substantially, in particular to an extent of 100 wt %, of a linear polycarbonate.

The polycarbonates may be produced in known fashion from diphenols, carbonic acid derivatives and optionally chain terminators and branching agents. Particulars pertaining to the production of polycarbonates have been well known to one skilled in the art for at least about 40 years. Reference may be made here for example to Schnell, Chemistry and Physics of Polycarbonates, Polymer Reviews, Volume 9, Interscience Publishers, New York, London, Sydney 1964, to D. Freitag, U. Grigo, P. R. Müller, H. Nouvertné, BAYER AG, Polycarbonates in Encyclopedia of Polymer Science and Engineering, Volume 11, Second Edition, 1988, pages 648-718, and finally to U. Grigo, K. Kirchner and P. R. Müller Polycarbonate in BeckerBraun, Kunststoff-Handbuch, Volume 31, Polycarbonate, Polyacetale, Polyester, Celluloseester, Carl Hanser Verlag Munich, Vienna 1992, pages 117-299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with for example diphenyl carbonate is likewise possible. Diphenols suitable for producing polycarbonates are for example hydroquinone, resorcinol, dihydroxybiphenyls, bis(hydroxyphenyl)alkanes, bis(hydroxyphenyl)cycloalkanes, bis(hydroxyphenyl)sulphides, bis (hydroxyphenyl)ethers, bis(hydroxyphenyl)ketones, bis (hydroxyphenyl)sulphones, bis(hydroxyphenyl) sulphoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

Preferably employed diphenols are those based on phthalimides, for example 2-aralkyl-3,3'-bis(4-hydroxyphenyl) phthalimides or 2-aryl-3,3'-bis(4-hydroxyphenyl)phthalimides such as 2-phenyl-3,3'-bis(4-hydroxyphenyl) phthalimide, 2-alkyl-3,3'-bis(4-hydroxyphenyl) phthalimides, such as 2-butyl-3,3'-bis(4-hydroxyphenyl) phthalimides, 2-propyl-3,3'-bis(4-hydroxyphenyl) phthalimides, 2-ethyl-3,3'-bis(4-hydroxyphenyl) phthalimides or 2-methyl-3,3'-bis(4-hydroxyphenyl) phthalimides and also diphenols based on isatins substituted at the nitrogen such as 3,3-bis(4-hydroxyphenyl)-1-phenyl-1H-indol-2-one or 2,2-bis(4-hydroxyphenyl)-1-phenyl-1H-indol-3-one.

Preferred diphenols are 4,4'-dihydroxydiphenyl, 2,2-bis (4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and other suitable diphenols are described for example in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph H. Schnell, Chemistry and Physics of Polycarbonates, Interscience Publishers, New York 1964 and also in JP-A 620391986, JP-A 620401986 and JP-A 1055501986.

In the case of homopolycarbonates only one diphenol is employed and in the case of copolycarbonates two or more diphenols are employed.

Examples of suitable carbonic acid derivatives include phosgene or diphenyl carbonate. Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are phenols which are mono- or polysubstituted with linear or branched, preferably unsubstituted C1 to C30 alkyl radicals or with tert-butyl. Particularly preferred chain terminators are phenol, cumylphenol and/or p-tert-butylphenol. The quantity of chain terminator to be used is preferably from 0.1 to 5 mol %, based on moles of diphenols respectively used. The addition of the chain terminators may be carried out before, during or after the reaction with a carboxylic acid derivative.

Suitable branching agents are the trifunctional or more than trifunctional compounds familiar in polycarbonate chemistry, in particular those having three or more than three phenolic OH groups.

Suitable branching agents are for example 1,3,5-tri(4-hydroxyphenyl)benzene, 1,1,1-tri(4-hydroxyphenl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4-dihydroxytriphenyl)methyl)benzene and 3,3-bis(3-methyl-4-hydroxyphenyl)-2-oxo-2,3-dihydroindole.

The amount of the branching agents for optional employment is preferably from 0.05 mol % to 3.00 mol % based on moles of diphenols used in each case. The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Furthermore, copolycarbonates may also be used. To produce these copolycarbonates 1 wt % to 25 wt %, preferably 2.5 wt % to 25 wt %, particularly preferably 2.5 wt % to 10 wt %, based on the total amount of diphenols to be employed, of polydiorganosiloxanes having hydroxyaryloxy end groups may be employed. These are known (U.S. Pat. Nos. 3,419,634, 3,189,662, EP 0 122 535, U.S. Pat. No. 5,227,449) and may be produced by methods known in the literature. Likewise suitable are polydiorganosiloxane-containing copolycarbonates; the production of polydiorganosiloxane-containing copolycarbonates is described in DE-A 3 334 782 for example.

The polycarbonates may be present alone or as a mixture of polycarbonates. It is also possible to employ the polycarbonate or the mixture of polycarbonates together with one or more plastics distinct from polycarbonate as blend partners.

Blend partners that may be employed include polyamides, polyesters, in particular polybutylene terephthalate and polyethylene terephthalate, polylactide, polyether, thermoplastic polyurethane, polyacetal, fluoropolymer, in particular polyvinylidene fluoride, polyethersulphones, polyolefin, in particular polyethylene and polypropylene, polyimide, polyacrylate, in particular poly(methyl)methacrylate, polyphenylene oxide, polyphenylene sulphide, polyetherketone, polyaryletherketone, styrene polymers, in particular polystyrene, styrene copolymers, in particular styrene acrylonitrile copolymer, acrylonitrile butadiene styrene block copolymers and polyvinyl chloride.

Up to 50.0 wt %, preferably 0.2 to 40 wt %, particularly preferably 0.10 to 30.0 wt %, based on the weight of the thermoplastic, of other customary additives may optionally also be present.

This group comprises flame retardants, anti-drip agents, thermal stabilizers, demoulding agents, antioxidants, UV absorbers, IR absorbers, antistats, optical brighteners, light-scattering agents, colourants such as pigments, including inorganic pigments, carbon black and/or dyes, and inorganic fillers in amounts customary for polycarbonate. These additives may be added individually or else in a mixture.

Such additives as are typically added in the case of polycarbonates are described, for example, in EP-A 0 839 623, WO-A 96/15102, EP-A 0 500 496 or "Plastics Additives Handbook", Hans Zweifel, 5th Edition 2000, Hanser Verlag, Munich.

Polyamides suitable in accordance with the invention are likewise known or producible by literature processes.

Polyamides suitable in accordance with the invention are known homopolyamides, copolyamides and mixtures of these polyamides. These may be semicrystalline and/or amorphous polyamides. Suitable semicrystalline polyamides include polyamide-6, polyamide-6,6 and mixtures and corresponding copolymers of these components. Also contemplated are semicrystalline polyamides whose acid component consists entirely or partly of terephthalic acid and/or isophthalic acid and/or suberic acid and/or sebacic acid and/or azelaic acid and/or adipic acid and/or cyclohexane dicarboxylic acid, whose diamine component consists entirely or partly of m- and/or p-xylylenediamine and/or hexamethylenediamine and/or 2,2,4-trimethylhexamethylenediamine and/or 2,4,4-trimethylhexamethylenediamine and/or isophoronediamine and whose composition is known in principle.

Mention may also be made of polyamides produced entirely or partly from lactams having 7 to 12 carbon atoms in the ring, optionally with co-use of one or more of the abovementioned starting components.

Particularly preferred semicrystalline polyamides are polyamide-6 and polyamide-6,6 and mixtures thereof.

Amorphous polyamides that may be employed include known products. These are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis(aminomethyl)norbornane and/or 1,4-diaminomethylcyclohexane with dicarboxylic acids such as oxalic acid, adipic acid, azelaic acid, decanedicarboxylic acid, heptadecanedicarboxylic acid 2,2,4- and/or 2,4,4-trimethyladipic acid, isophthalic acid and terephthalic acid.

Also suitable are copolymers obtained by polycondensation of two or more monomers as are copolymers produced by addition of aminocarboxylic acids such as e-aminocaproic acid, w-aminoundecanoic acid or w-aminolauric acid or lactams thereof.

Particularly suitable amorphous polyamides are polyamides produced from isophthalic acid, hexamethylenediamine and further diamines such as 4,4-diaminodicyclohexylmethane, isophoronediamine, 2,2,4- and/or 2,4,4-trimethylhexamethylenediamine, 2,5- and/or 2,6-bis (aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and laurolactam; from terephthalic acid and the isomer mixture composed of 2,2,4- and/or 2,4,4-trimethylhexamethylenediamine.

Instead of pure 4,4'-diaminodicyclohexylmethane it is also possible to employ mixtures of the geometrically isomeric diaminodicyclohexylmethanes composed of 70 to 99 mol % of the 4,4'-diamino isomer,
1 to 30 mol % of the 2,4'-diamino isomer and
0 to 2 mol % of the 2,2'-diamino isomer, optionally correspondingly more-highly condensed diamines obtained by hydrogenation of technical-grade diaminodiphenylmethane. Up to 30% of the isophthalic acid may be replaced by terephthalic acid.

The polyamides preferably have a relative viscosity (measured using a 1 wt % solution in m-cresol at 25° C.) of 2.0 to 5.0, particularly preferably of 2.5 to 4.0.

Thermoplastic polyurethanes suitable in accordance with the invention are likewise known or producible by literature processes.

An overview of the production, properties and applications of thermoplastic polyurethanes (TPU) may be found for example in Kunststoff Handbuch [G. Becker, D. Braun], volume 7 "Polyurethane", Munich, Vienna Carl Hanser Verlag, 1983.

TPUs are usually constructed from linear polyols (macrodiols), such as polyester, polyether or polycarbonate diols, organic diisocyanates and short-chain, mostly difunctional alcohols (chain extenders). The TPUs may be produced in continuous or batchwise fashion. The best-known production processes are the belt process (GB-A 1 057 018) and the extruder process (DE-A 19 64 834).

The employed thermoplastic polyurethanes are reaction products of
I) organic diisocyanates
II) polyols
III) chain extenders.

Diisocyanates (I) that may be used include aromatic, aliphatic, araliphatic, heterocyclic and cycloaliphatic diisocyanates or mixtures of these diisocyanates (cf HOUBEN-WEYL "Methoden der organischen Chemie", Volume E20 "Makromolekulare Stoffe", Georg Thieme Verlag, Stuttgart, New York 1987, pp. 1587-1593 or Justus Liebigs Annalen der Chemie, 562, pages 75 to 136).

Specifically, mention may be made for example of: aliphatic diisocyanates, such as hexamethylenediamine diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanato-1,2-diphenylethane and 1,5-naphthylene diisocyanate. Preference is given to using 1,6-hexamethylene diisocyanate, isophorone diisocyanate, dicyclohexylmethane diisocyanate, diphenylmethane diisocyanate isomer mixtures having a 4,4'-diphenylmethane diisocyanate content of >96 wt % and in particular 4,4'-diphenylmethane diisocyanate and 1,5-naphthylene diisocyanate. The recited diisocyanates may be used individually or in the form of mixtures with one another. They may also be used together with up to 15 wt % (based on the total amount of diisocyanate) of a polyisocyanate, for example triphenylmethane 4,4',4''-triisocyanate or polyphenylpolymethylene polyisocyanates.

Zerewitinoff-active polyols (II) are those having on average not less than 1.8 to not more than 3.0 zerewitinoff-active hydrogen atoms and a number-average molecular weight $\overline{M}_n$ of 500 to 10 000 g/mol, preferably 500 to 6000 g/mol.

This includes, in addition to compounds comprising amino groups, thiol groups or carboxyl groups, in particular compounds comprising two to three, preferably two, hydroxyl groups, specifically those having number-average molecular weights $\overline{M}_n$ of 500 to 10 000 g/mol, particularly preferably those having a number-average molecular weight $\overline{M}_n$ of 500 to 6000 g/mol, for example hydroxyl-containing polyesters polyethers, polycarbonates and polyesteramides or mixtures thereof.

Suitable polyether diols may be produced by reacting one or more alkylene oxides having 2 to 4 carbon atoms in the alkylene radical with a starter molecule comprising two active hydrogen atoms in bonded form. Alkylene oxides that may be mentioned are for example: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used individually, in alternating succession or as mixtures. Examples of useful starter molecules include: water, amino alcohols, such as N-alkyldiethanolamines, for example N-methyldiethanolamine, and diols such as ethylene glycol, 1,3-propylene glycol, 1,4-butanediol and 1,6-hexanediol. Mixtures of starter molecules may optionally also be used. Suitable polyetherols further include the hydroxyl-containing polymerization product of tetrahydrofuran. Trifunctional polyethers may also be employed in proportions of 0 to 30 wt % based on the bifunctional polyethers but at most in an amount that provides a product that is still thermoplastically processable. The essentially linear polyether diols preferably have number-average molecular weights $\overline{M}_n$ of 500 to 10 000 g/mol, particularly preferably 500 to 6000 g/mol. They may be used either individually or in the form of mixtures with one another.

Suitable polyester diols may be produced from, for example, dicarboxylic acids having 2 to 12 carbon atoms, preferably 4 to 6 carbon atoms, and polyhdric alcohols. Contemplated dicarboxylic acids include for example: aliphatic dicarboxylic acids such as succinic acid, glutaric acid, adipic acid, suberic acid, azelaic acid and sebacic acid, or aromatic dicarboxylic acids, such as phthalic acid, isophthalic acid and terephthalic acid. The dicarboxylic acids may be used individually or as mixtures, for example in the form of a succinic acid, glutaric acid and adipic acid mixture. To produce the polyester diols, it may in some cases be advantageous to use instead of the dicarboxylic acids the corresponding dicarboxylic acid derivatives, such as carboxylic diesters having 1 to 4 carbon atoms in the alcohol radical, carboxylic anhydrides or carbonyl chlorides. Examples of polyhydric alcohols are glycols having 2 to 10, preferably 2 to 6, carbon atoms, for example ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. Depending on the desired properties, the polyhydric alcohols may be used alone or in admixture with one another. Also suitable are esters of carbonic acid with the recited diols, in particular those having 4 to 6 carbon atoms, such as butane-1,4-diol or hexane-1,6-diol, condensation products of ω-hydroxycarboxylic acids such as ω-hydroxycaproic acid or polymerization products of lactones, for example optionally substituted ω-caprolactones. Preferably employed polyester diols are ethanediol polyadipate, 1,4-butanediol polyadipate, ethanediol-1,4-butanediol polyadipate, 1,6-hexanediol neopentyl glycol polyadipate, 1,6-hexanediol-1,4-butanediol polyadipate and polycaprolactone. The polyester polyols have number-average molecular weights $\overline{M}_n$ of 500 to 10 000 g/mol, particularly preferably 600 to 6000 g/mol, and may be used individually or in the form of mixtures with one another.

Zerewitinoff-active polyols (III) are so-called chain extending agents and have on average 1.8 to 3.0 Zerewitinoff-active hydrogen atoms and have a number-average molecular weight $\overline{M}_n$ of 60 to 500 g/mol. This is to be understood as meaning not only amino-, thiol- or carboxyl-containing compounds but also compounds having two to three, preferably two, hydroxyl groups.

Chain extending agents employed are diols or diamines having a molecular weight of 60 to 495 g/mol, preferably aliphatic diols having 2 to 14 carbon atoms, for example ethanediol, 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with glycols having 2 to 4 carbon atoms, for example terephthalic acid bis-ethylene glycol or terephthalic acid bis-1,4-butanediol, hydroxyalkylene ethers of hydroquinone, for example 1,4-di(β-hydroxyethyl)hydroquinone, ethoxylated bisphenols, for example 1,4-di(β-hydroxyethyDbisphenol A, (cyclo)aliphatische diamine, such as isophoronediamine, ethylenediamine, 1,2-propylenediamine, 1,3-propylenediamine, N-methylpropylene-1,3-diamine, N,N'-dimethylethylenediamine and aromatic diamines such as 2,4-tolylenediamine, 2,6-tolylenediamine, 3,5-diethyl-2,4-tolylenediamine or 3,5-diethyl-2,6-tolylenediamine or primary mono-, di-, tri- or tetraalkyl-substituted 4,4'-diaminodiphenylmethanes. Particularly preferably employed chain extending agents are ethanediol, 1,4-butanediol, 1,6-hexanediol, 1,4-di(β-hydroxyethyl)hydroquinone or 1,4-di(β-hydroxyethyl)bisphenol A. Mixtures of the above mentioned chain extenders may also be employed. In addition, it is also possible to add relatively small amounts of triols.

Compound that are monofunctional toward isocyanates may be employed in proportions of up to 2 wt % based on thermoplastic polyurethane, as so-called chain terminators or demolding aids. Examples of suitable compounds are monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

The relative amounts of the compounds (II) and (III) are preferably chosen such that ratio of the sum of the isocyanate groups in (I) to the sum of the Zerewitinoff-active hydrogen atoms in (II) and (III) is 0.85:1 to 1.2:1, preferably 0.95:1 to 1.1:1.

The thermoplastic polyurethane elastomers (TPUs) employed in accordance with the invention may comprise as auxiliary and additive substances up to a maximum of 20 wt % based on the total amount of TPU of the customary auxiliary and additive substances. Typical auxiliary and additive substances are catalysts, pigments, colorants, flame retardancy, stabilizers against aging and weathering effects, plasticizers, glidants and demolding agents, fungistatic and bacteriostatic substances and fillers and mixtures thereof.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and similar and also in particular organic metal compounds such as titanic esters, iron compounds or tin compounds such as tin diacetate, tin dioctoate, tin dilaurate or the dialkyltin salts of aliphatic carboxylic acids such as dibutyltin diacetate or dibutyltin dilaurate or similar. Preferred catalysts are organic metal compounds, in particular titanic esters, iron compounds and tin compounds. The total amount of catalysts in the TPUs is generally about 0 to 5 wt %, preferably 0 to 2 wt %, based on the total amount of TPU.

Examples of further added substances are glidants, such as fatty acid esters, metal soaps thereof, fatty acid amides, fatty acid ester amides and silicone compounds, antiblocking agents, inhibitors, stabilizers against hydrolysis, light, heat and discoloration, flame retardants, dyes, pigments, inorganic and/or organic fillers and reinforcers. Reinforcers are in particular fibrous reinforcing materials, for example inorganic fibres, which are produced by prior art methods and may also be sized. Further information about the recited auxiliary and additive substances mentioned may be found in the specialist literature, for example in the monograph by J. H. Saunders and K. C. Frisch "High Polymers", Volume XVI, Polyurethane, Part 1 and 2, Interscience Publishers 1962/1964, in "Taschenbuch für Kunststoff-Additive" by R. Gächter and H. Müller (Hanser Verlag Munich 1990) or in DE-A 29 01 774.

Further additions which may be incorporated into the TPU are thermoplastics, for example polycarbonates and acrylonitrile/butadiene/styrene terpolymers, in particular ABS. Other elastomers such as rubber, ethylene/vinyl acetate copolymers, styrene/butadiene copolymers and other TPU may also be used.

Also suitable for incorporation are commercially available plasticizers such as phosphates, phthalates, adipates, sebacates and alkylsulphonic esters.

Polyethylene suitable in accordance with the invention is likewise known or producible by literature processes. The polyethylene may be not only PE-HD (HDPE), PE-LD (LDPE), PE-LLD (LLDPE), PE-HMW but also PE-UHMW.

The polypropylene, polyphenylene sulfone, polyetherimide and polyether ketone suitable in accordance with the invention is likewise known or producible by literature processes.

It may generally be useful to add thermal stabilizers and flow improvers to the thermoplastic used for the matrix provided that these do not reduce the molecular weight of the thermoplastic and/or reduce the Vicat temperature.

Contemplated materials for the fibres include both natural fibres, for example fibrous minerals or vegetable fibres, and man-made fibres, for example inorganic synthetic fibres or organic synthetic fibres. Glass, carbon or polymer fibres are preferred, glass or carbon fibres being preferred in turn.

It is very particularly preferable to employ glass fibres having a modulus of elasticity of greater than 70 GPa, preferably greater than 80 GPa, particularly preferably greater than 90 GPa, or carbon fibres having a modulus of elasticity of greater than 240 GPa, preferably greater than 245 GPa, particularly preferably of 250 GPa or more. Carbon fibres having these aforementioned moduli of elasticity are preferred in particular. Such carbon fibres are for example commercially available from Mitsubishi Rayon CO., LtD. under the trade name Pyrofil.

The fibres are generally coated with a so-called size. When a thermoplastic is used as the matrix material, suitable systems for sizes often comprise a thermoset, a silane, an epoxy resin or a polyurethane. However it is also possible for the fibres, or a portion of the fibres, to comprise no size.

The tapes generally have a length of 100 to 3000 m, a width of 60 to 2100 mm, preferably of 500 to 1000 mm, particularly preferably of 600 to 800 mm, and a thickness of 100 to 350 µm, preferably of 120 to 200 µm in the running direction. However, tapes having other dimensions may also be processed on the apparatus according to the invention.

The alignment of the fibers in a tape is in each case unidirectional, i.e. the fibers in a tape are parallel to one another. However, the fibers may be aligned in any desired direction in the plane of the tape. Yet, the fibers are preferably aligned in a direction of 0°, 30°, 33°, 45°, 60° and 90° to the running direction in the plane of the tape. The respective fibers are of sufficient length that depending on their alignment they span from one side of the sheeting to the respective opposite side. For fibers aligned in the 0° direction or in the—technically identical—180° direction this means that they are of the same length as the sheeting itself (effectively endless) while fibers oriented in the 90° are of a length equal to the width of the sheeting. For angles of neither zero nor 180° nor a multiple of 180° the length of the fibers in the tape is equal to the width of the tape divided by the sine of the angle in degrees by which the alignment of the fiber deviates from the running direction of the tape.

The production of fiber-reinforced semifinished panels from tapes provides economy advantages since the process step of semifinished textile production may be eschewed. The mechanical properties of the fiber-reinforced semifinished panels may also be adapted by selection of the number of the tapes that are processed into a fiber-reinforced semifinished panel.

The mechanical properties of the fiber-reinforced semifinished panels may also be adapted by selecting the tapes for processing by the alignment of the fibers. Thus, the fibers of the tapes for processing may all have the same alignment, in the simplest case all in the 0° direction to the running direction of the tape. Alternatively, the fibers of at least one tape for processing may have a different alignment to the fibers of the other tape or tapes.

To obtain an industrially useful fiber-reinforced semifinished panel it must be ensured that in terms of the alignment of the fibers the ply construction of the tape is both symmetrical and balanced in order to obtain an industrially useful fiber-reinforced semifinished panel.

In this context, balanced is to be understood as meaning that the sum of the angles at which the fibers in the tapes of a semifinished panel are aligned must always be 0°, wherein an angle that in the running direction of the tape is measured in an anticlockwise direction is given the opposite prefix to an angle that in the running direction of the tape is measured in a clockwise direction. The magnitude of the angle is reported such that in each case the smaller magnitude of the number is cited wherein the accompanying prefix is determined as described above. Thus for example the angle −150° corresponds to an angle of 30° and the magnitude of 30° is then reported for the angle. The angle 135° corresponds to an angle of −45° and the magnitude of −45° is then reported for the angle.

Fiber-reinforced semifinished panels constructed only from tapes whose fibers are aligned only in the 0° direction and/or 90° direction to the running direction of the tape are likewise balanced.

In this context symmetrical is to be understood as meaning that the ply construction—viewed from the middle of the ply construction—is mirrored, for example according to the pattern 0°, 90°, 0° or 0°, 60°, −60°, 0° or 0°, 60°, 90°, −60°, 0° or 0°, 60°, 0°, −60°, 0° or 45°, −45°. Asymmetrical but still industrially useful are fiber-reinforced semifinished panels constructed from only two tapes, wherein the fibers of one tape are aligned in the 0° direction, and the fibres of the other tape are aligned in the 90° direction, to the running direction of the tape, i.e. 0°, 90° or 45°, −45°.

It is moreover advantageous when the ply construction comprises at least two tapes where the alignment of the fibers differs by 90°. It is particularly advantageous when the ratio of the fibers—based on tensile strength—in these at least two tapes is 1:9 to 1:1.

The dimensions of the unidirectionally fiber-reinforced semifinished products may span from long sheetings where the length of the sheeting is many times, normally more than one hundred times, greater than the width of the sheeting to sheeting pieces where the length and the width of the sheeting are identical. As previously mentioned the unidirectionally fiber-reinforced semifinished products are generally in the form of tapes, i.e. sheetings.

To produce the fiber-reinforced semifinished panels a plurality of tapes are face to face superposed so that the edges of the plies run parallel to one another and the tapes lie flushly on top of one another, i.e. there are no projecting lips, and then inseparably conjoined.

In the context of the present invention "inseparably" is to be understood as meaning that the tapes in the multidirectionally fiber-reinforced semifinished product are conjoined such that a separation of the tape destroyed the overall structure of the fiber-reinforced semifinished panel.

To produce the fiber-reinforced semifinished panels, in a first step the tapes are generally continuously unrolled from rolls, each tape having its own roll. The tapes are then superposed according to the intended ply construction in the fiber-reinforced semifinished panel and supplied to a device which in a second step inseparably conjoins the tapes. The fiber-reinforced semifinished panels are then obtained from the now inseparably conjoined tapes which still constitute an effectively endless sheeting when in a third step said panels are cut from the sheeting of the inseparably conjoined tapes; the obtained sheeting of these inseparably conjoined tapes is hereinbelow also referred to as a fiber-reinforced semifinished panel sheeting.

It is preferable when in the production of the fiber-reinforced semifinished panel sheeting and the therefrom-obtained fiber-reinforced semifinished panels composed of two, three, four, five, six or more face to face superposed tapes, the alignment of the fibers of at least one of the tapes is distinct from the alignment of the fibers of the other tape or tapes. In such a case a multidirectionally fiber-reinforced semifinished panel is obtained. Compared to unidirectionally fiber-reinforced semifinished panels, multidirectionally fiber-reinforced semifinished panels have the advantage that they can readily dissipate forces from several directions while unidirectionally fiber-reinforced semifinished panels can only readily dissipate forces from one direction. The multidirectionally fiber-reinforced semifinished panels can therefore be configured and produced in a force-path-appropriate manner.

Preference is given to fiber-reinforced semifinished panels produced from three, four, five, six or more face to face superposed tapes, wherein the alignment of the fibers in the uppermost tape is the same as the alignment of the fibers in the lowermost tape and at least one tape located between the uppermost tape and the lowermost tape has a different alignment of the fibers than the fibers of the lowermost tape and the uppermost tape and where the ply construction of the tapes is both symmetrical and balanced in terms of the alignment of the fibers.

Also preferred are fiber-reinforced semifinished panels where the ply construction comprises at least two tapes where the alignment of the fibers differs by 90°. It is particularly advantageous when the ratio of the fibers—based on tensile strength and modulus of elasticity—in these at least two tapes is 1:9 to 1:1.

Very particular preference is given to fiber-reinforced semifinished panels having a ply construction of tapes where the tapes—determined according to the angle at which the fibers are aligned to the running direction of the tape—are arranged according to one of the following patterns:
0°, 90°, 0°; or
0°, 90°, 90°, 0°; or
0°, 90°, 0°, 90°, 0°; or
0°, 90°, 90°, 90°, 0°; or
0°, 90°, 90°, 90°, 90°, 0°; or
−60°, 0°, 60°; or
0°, 60°, −60°, 0°; or
0°, 60°, 90°, −60°, 0°; or
0°, 60°, 0°, −60°, 0°; or
45°, −45°; or
0°, −45°, +45°, 90°; or
+45°, −45°, −45°, +45°; or
0°, +45, −45°, 0°, −45°, +45°, 0°; or
+45, −45°, 0°, 0°, +45, −45°, 0°, 0°, 0°, 0°, −45°, +45°, 0°, 0°, −45°, +45°; or
+45°, −45°, −45°, +45°, 0°, 0°, 0°, 90°, 90°, 0°, 0°, 0°, +45°, −45°, −45°, +45°; or
90°, +45, 0°, −45°, 0°, −45°, 0°, +45°, 90°; or
0°, +45, −45°, 90°, 90°, −45°, +45°, 0°; or
0°, +45, 90°, −45°, −45°, 90°, +45°, 0°; or
+45, −45°, 0°, 0°, 90°, 90°, 90°, 90°, 0°, 0°, −45°, +45°; or
+45, −45°, 0°, 0°, 90°, 90°, +45, −45°, 0°, 0°, 90°, 90°, 90°, 90°, 0°, 0°, 0°, −45°, +45°, +45, 90°, 90°,
0°, 0°, −45°, +45°, +45, or
0°, 33°, −33°, 0; or

0°, 33°, 90°, −33°, 0.

A decisive step in the production of the fiber-reinforced semifinished panel from tapes is the joining of precisely these tapes to afford the fiber-reinforced semifinished panel sheeting.

The prior art discloses performing this step using a press, for example with a double belt press, a static press or an interval heating press, in which the tapes are joined under the action of pressure and temperature to afford a fiber-reinforced semifinished panel sheeting. It is important for this joining that the tapes are conjoined full-face to full-face or at least virtually full-face to full-face, i.e to an extent of more than 99%, preferably to an extent of 99.5% to 99.99%, particularly preferably to an extent of 99.8% to 99.9%, based on the surfaces with which the tapes to be joined face each other, not only at individual dimensionally limited parts of the surfaces to be joined and not only along weld seams. This is generally ensured during performance of this process step with a press. A disadvantage of performing this process step with a press is that the heat input and output required therefor and the potentially required joining time, i.e. the time required to perform the full-face to full-face or at least virtually full-face to full-face joining of the tape, are high which increases the costs for production of fiber-reinforced semifinished panels.

A further disadvantage of performing the process step of joining with a press is that below the lowermost tape and above the uppermost tape, i.e. the tapes which contact the press during pressing, release means, for example a release film or a release paper, need to be mounted in each case so that the material of the tape does not adhere to the press during pressing. Adhesion of the material of the tape to the press not only has the result that removal can be effected only with great effort and inconvenience but also has the result that the fiber-reinforced semifinished panel sheeting has a surface which renders the semifinished panel obtained therefrom unusable, i.e. scrap. However, the release means itself incurs costs and the disposal thereof after only a single use also incurs costs. The release means also entails additional apparatus complexity, for example in the form of dedicated rolls, winding-up and unwinding means and/or guides.

A further disadvantage of performing the process step of joining with a press is that said process can only be performed discontinuously.

It is an object of the present invention to overcome the disadvantages of the prior art. It is a particular object of the present invention to perform the process step of joining the tapes to afford a fiber-reinforced semifinished panel sheeting in such a way that less energy is consumed and/or less time is used therefor. The process step of joining shall furthermore be performable without release means without the material of the uppermost and/or lowermost tape adhering to the device used for joining. The process shall furthermore be as cost-effective as possible.

According to the invention the object is achieved when the process step of joining is performed by ultrasonic welding.

Ultrasonic welding per se is known. It is a friction welding process where welding is achieved through a high-frequency mechanical vibration in the range of in general 20 to 35 kHz which results in heating between the components via molecular and interfacial friction.

A generator is used to generate high-frequency alternating current which is transmitted via a coaxial cable to an ultrasound transducer, the so-called converter, which uses the piezoelectric or magnetostrictive effect to generate a mechanical ultrasonic vibration therefrom. These vibrations are transmitted via an amplitude transformer to a sonotrode. Different applications require different designs of sonotrodes, normally produced from steel, aluminium or titanium, and the geometry thereof depends on the frequency provided by the generator employed and on the processing task.

Sonotrodes are tools set into resonance vibration by the introduction of high-frequency mechanical vibrations, i.e. ultrasound. They provide the connection from the ultrasound generator to the workpiece and adapt the ultrasonic vibration to the processing task. Sonotrodes are used in ultrasonic welding in order to produce a permanent joining of the components in the joining or contact zones through various processes.

The sonotrode and the anvil are the only components of an ultrasonic welding machine in direct contact with the part to be welded. Their workfaces must therefore be shaped in such a way that the ultrasonic vibrations are optimally introduced into the joining zone and impressions on the parts to be welded are avoided. The mechanical vibrations are introduced vertically into the joining zones of the part to be welded.

When welding plastic the vibration is generally introduced perpendicularly to the joining partners. The plastic undergoes heating and starts to soften which causes the damping coefficient to increase. The increase in the damping coefficient results in higher internal friction which further accelerates the temperature increase. The molten materials join and, after cooling and solidification, are welded to one another.

In addition to spot welds, roller sonotrodes also make it possible to produce seam welds.

Ultrasonic welding is characterized by very short welding times and high economy. Identical and different materials may be conjoined, the workpieces are heated to a small extent only in the weld region and the surrounding material is thus not damaged.

Thus, DE102011006930A1 discloses welding multilayer plastic films by ultrasound, wherein only the welding of two plastic films is disclosed explicitly. Also, the plastic films disclosed in DE102011006930A1 are not fiber-reinforced plastic films.

U.S. Pat. No. 6,450,393 B1 discloses joining fiber-reinforced materials by ultrasonic welding but without more particularly specifying these materials. One disadvantage of the process according to U.S. Pat. No. 6,450,393 B1 is that only two plies of a material can ever be welded to one another. If the workpiece to be produced is to comprise more than two plies, then the further plies need to be gradually joined to the plies previously welded together. Additionally, U.S. Pat. No. 6,450,393 B1 only discloses welding the plies only at individual dimensionally limited parts of the to-be-joined surfaces in effectively punctiform fashion or only along weld seams, i.e. effectively linearly, but not full-face to full-face or virtually full-face to full-face. This has the disadvantage that the joining of the individual layers to one another is not as strong.

DE60203770T2 discloses joining stacked layers of metallic materials by ultrasonic welding, wherein up to four layers may be conjoined. The layers are conjoined only along individual lines but not full-face to full-face or virtually full-face to full-face. This too has the disadvantage that the joining of the individual layers to one another is not as strong. DE60203770T2 moreover does not disclose corresponding joining of a plurality of tapes to afford a semifinished panel.

However, ultrasonic welding is also feasible for joining tapes to afford a fiber-reinforced semifinished panel. Here too, the individual tapes need to conjoined full-face to full-face or at least virtually full-face to full-face. Ultrasonic welding has not hitherto been used therefor because there is a prejudice that ultrasonic welding can introduce sufficient energy for joining two workpieces only in limited fashion onto small surfaces. These workpieces are thus only conjoined at individual dimensionally limited parts of the areas to be joined or in the case of linearly progressing ultrasonic welding along linear weld seams. This prejudice is dispelled by using roller sonotrodes to effect ultrasonic welding of the tapes to afford a fiber-reinforced semifinished panel.

Ultrasonic welding accordingly allows two, three, four, five, six or more tapes to be inseparably conjoined full-face to full-face or virtually full-face to full-face to afford a fiber-reinforced semifinished panel sheeting. The fiber-reinforced semifinished panels are obtainable from this fiber-reinforced semifinished panel sheeting by cutting.

The tool for cutting may for example be in the form of a rotary cutter, an impact shear, a plate shear, a guillotine, a lever shear, a laser, a waterjet cutting device, a milling machine, a chopsaw, a band saw, a cutting disc or another suitable embodiment.

The joining of the tapes to afford a fiber-reinforced semifinished panel sheeting by ultrasonic welding also makes continuous performance of this operation possible. As a rule this is not possible with a press; the operation of joining the tapes to afford a fiber-reinforced semifinished panel sheeting can generally be performed only discontinuously with a press. An exception to this rule would be performance of the joining operation with a roller belt press. However, these presses have great disadvantages since compared to ultrasound machines for the same purpose they are far more costly to purchase and in addition have far greater space and energy requirements. Performance of the joining operation with a roller belt press additionally has the disadvantage that a release means must be employed.

The joining of the tapes to afford a fiber-reinforced semifinished panel sheeting by ultrasonic welding therefore also makes it possible for the production of the fiber-reinforced semifinished panel to be performed continuously instead of only discontinuously since the tapes can be unrolled from their respective rolls and supplied to the at least one roller sonotrode continuously. Since the operation of cutting the fiber-reinforced semifinished panel from the semifinished panel sheeting has a very short duration compared to the total duration of the process for producing the fiber-reinforced semifinished panel from unrolling the tape (operation 1) via joining the tapes (operation 2) up to cutting the fiber-reinforced semifinished panel (operation 3), i.e. the process is not stalled thereby, this third operation may also be regarded as continuous in the context of the present invention.

The invention accordingly provides a:
process for producing a fiber-reinforced semifinished panel comprising the following operations:
(1) unrolling two, three, four, five, six or more unidirectionally fiber-reinforced semifinished products (tapes) from rolls;
(2) joining the tapes to afford a fiber-reinforced semifinished panel sheeting by ultrasonic welding;
(3) cutting the fiber-reinforced semifinished panel from the fiber-reinforced semifinished panel sheeting.

The two, three, four, five, six or more tapes are in a face to face superposed arrangement and the tapes are inseparably conjoined full-face to full-face or virtually full-face to full-face.

The alignment of the fibers of at least one of the tapes is distinct from the alignment of the fibers of the other tape or tapes.

Preference is given to fiber-reinforced semifinished panels produced from three, four, five or six or more face to face superposed tapes, wherein the alignment of the fibers in the uppermost tape is the same as the alignment of the fibers in the lowermost tape and at least one tape located between the uppermost tape and the lowermost tape has a different alignment of the fibers than the fibers of the lowermost tape and the uppermost tape and where the ply construction of the tapes is both symmetrical and balanced in terms of the alignment of the fibers.

Also preferred are fiber-reinforced semifinished panels where the ply construction comprises at least two tapes where the alignment of the fibers differs by 90°. It is particularly advantageous when the ratio of the fibers—based on tensile strength and modulus of elasticity—in these at least two tapes is 1:9 to 1:1.

Particular preference is given to fiber-reinforced semifinished panels having a ply construction of tapes where the tapes—determined according to the angle at which the fibers are aligned to the running direction of the tape—are arranged according to one of the following patterns:
0°, 90°, 0°; or
0°, 90°, 90°, 0°; or
0°, 90°, 0°, 90°, 0°; or
0°, 90°, 90°, 90°, 0°; or
0°, 90°, 90°, 90°, 90°, 0°; or
−60°, 0°, 60°; or
0°, 60°, −60°, 0°; or
0°, 60°, 90°, −60°, 0°; or
0°, 60°, 0°, −60°, 0°; or
45°, −45°; or
0°, −45°, +45°, 90°; or
+45°, −45°, −45°, +45°; or
0°, +45, −45°, 0°, −45°, +45°, 0°; or
+45, −45°, 0°, 0°, +45, −45°, 0°, 0°, 0°, 0°, −45°, +45°, 0°, 0°, −45°, +45°; or
+45°, −45°, −45°, +45°, 0°, 0°, 0°, 90°, 90°, 0°, 0°, 0°, +45°, −45°, −45°, +45°; or
90°, +45, 0°, −45°, 0°, −45°, 0°, +45°, 90°; or
0°, +45, 45°, 90°, 90°, −45°, +45°, 0°, or
0°, +45, 90°, −45°, −45°, 90°, +45°, 0°, or
+45, −45°, 0°, 0°, 90°, 90°, 90°, 90°, 0°, 0°, −45°, +45°, or
+45, −45°, 0°, 0°, 90°, 90°, +45, −45°, 0°, 0°, 90°, 90°, 90°, 90°, 0°, 0°, −45°, +45°, +45, 90°, 90°, 0°, 0°, −45°, +45°, +45, or
0°, 33°, −33°, 0; or
0°, 33°, 90°, −33°; or The process is preferably performed continuously.

The process according to the invention can achieve advancement rates of the face to face superposed two, three, four, five, six or more tapes to be joined full-face to full-face or at least virtually full-face to full-face/of the fiber reinforced semifinished panel sheeting produced therefrom of 1 to 30 m per minute, preferably 5 to 15 m per minute.

The process according to the invention additionally requires no release means.

The invention accordingly further provides a:
process for producing a fiber-reinforced semifinished panel where two, three, four, five or more face to face superposed unidirectionally fiber-reinforced semifinished products (tapes) are inseparably conjoined full-face to full-face or at least virtually full-face to full-face by ultrasonic welding The invention further provides an:

apparatus for producing the above-described process, wherein parallel to the running direction of the tapes at least one sonotrode is arranged above or below said tapes and as an abutment to the at least one sonotrode at least one anvil wheel is mounted on the side of the tapes facing away from the at least one sonotrode.

The at least one sonotrode is preferably configured as a roller sonotrode.

The apparatus may comprise one or more sonotrodes depending on the width of the tape. The apparatus may thus also comprise two, three, four, five, six or more sonotrodes. It is preferable to employ one sonotrode per 20 to 100 mm in width of the tapes. If the apparatus comprises a plurality of sonotrodes these may form a straight line transverse to the running direction of the tape, be arranged offset relative to one another, for example in a zigzag arrangement, or be arranged in inclined alignment over the width of the tape/semifinished panel sheeting.

The apparatus according to the invention can achieve advancement rates of the face to face superposed two, three, four, five, six or more tapes to be joined full-face to full-face or at least virtually full-face to full-face/of the fiber-reinforced semifinished panel sheeting produced therefrom of 1 to 30 m per minute, preferably 5 to 15 m per minute.

It is preferable when an anvil wheel serves as an abutment for a respective sonotrode. However, the anvil wheel may also be implemented as a roller which serves as an abutment for two or more or all sonotrodes.

A pressing roller which exerts mechanical pressure on the ultrasonically welded fiber-reinforced semifinished panel and thus additionally strengthens the join between the tapes in the fiber-reinforced semifinished panel may also be mounted downstream of the sonotrode in the advancement direction.

The invention also provides a fiber-reinforced semifinished panel obtainable by at least one of the above-described processes according to the invention.

The thickness of this panel may be selected from a wide range depending on the number and thickness of the tapes from which it is constructed. However, the thickness of this panel is preferably from 200 µm to 1500 µm, particularly preferably from 300 µm to 1200 µm.

The invention also provides for the use of the semifinished panel according to the invention for the production of housing parts or housings or covers for IT devices, in particular of mobile computers such as notebooks and laptops, of housings or housing parts of household appliances, parts, in particular body parts, of automobiles or parts of aeroplanes.

In other words: the semifinished panel according to the invention may be used as a precursor of housing parts or housings or covers for IT devices, in particular of mobile computers such as notebooks and laptops, of housings or housing parts of household appliances, parts, in particular body parts, of automobiles or parts of aeroplanes.

Figure 1:
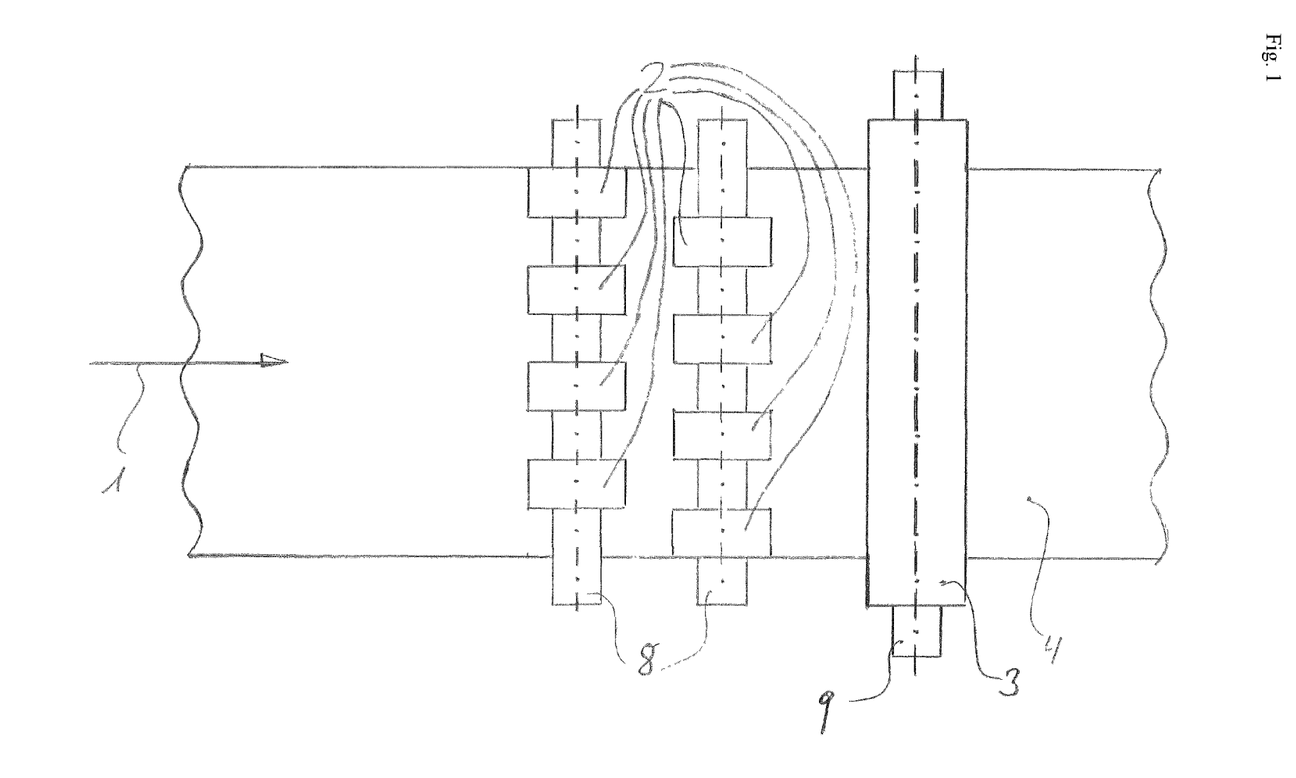
FIG. 1 plan view of a section of the inventive apparatus for producing a fiber-reinforced semifinished panel, wherein the sonotrodes are arranged in a zigzag.
Figure 2:
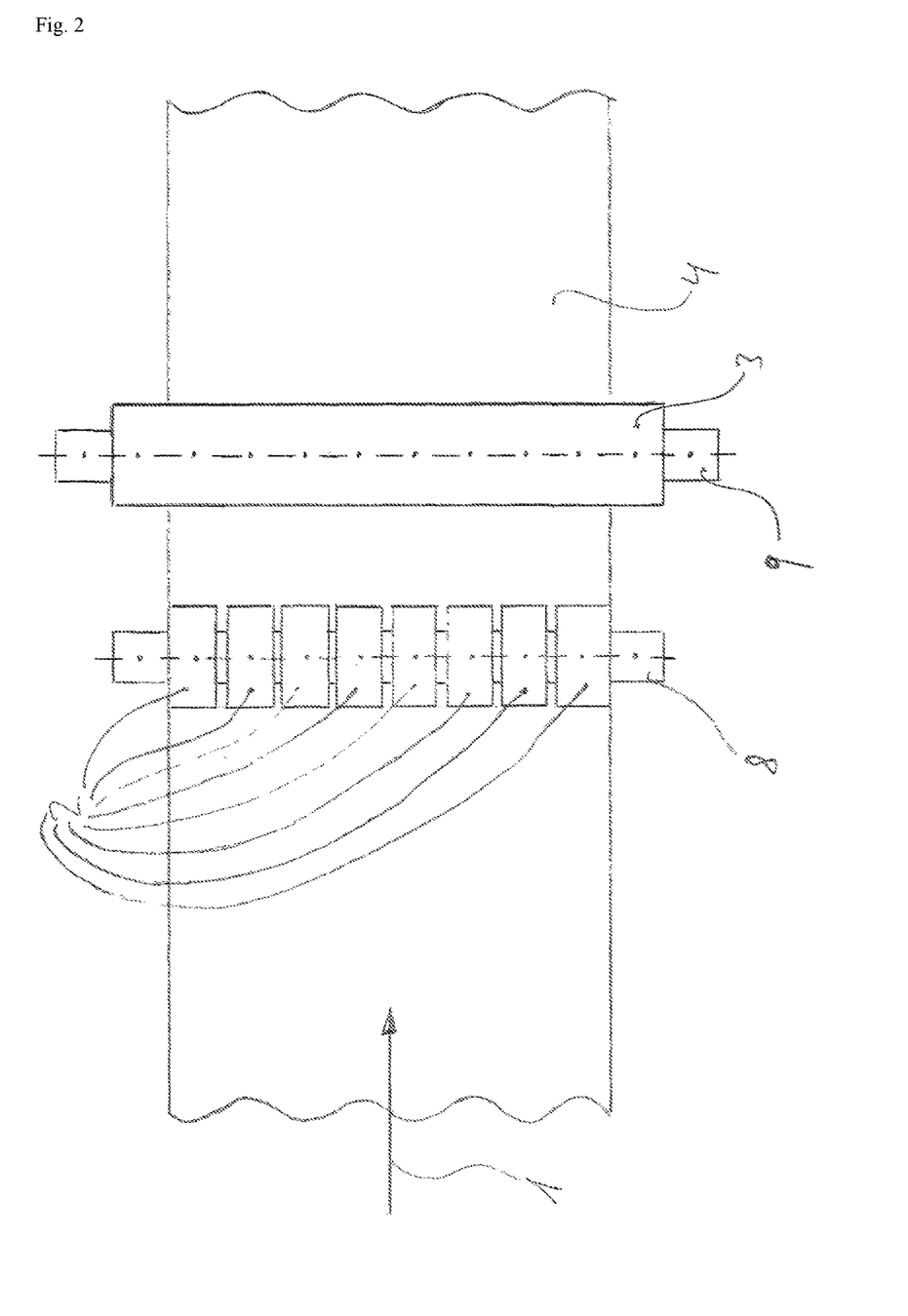
FIG. 2 plan view of a section of the inventive apparatus for producing a fiber-reinforced semifinished panel, wherein the sonotrodes are arranged in straight line.
Figure 3:
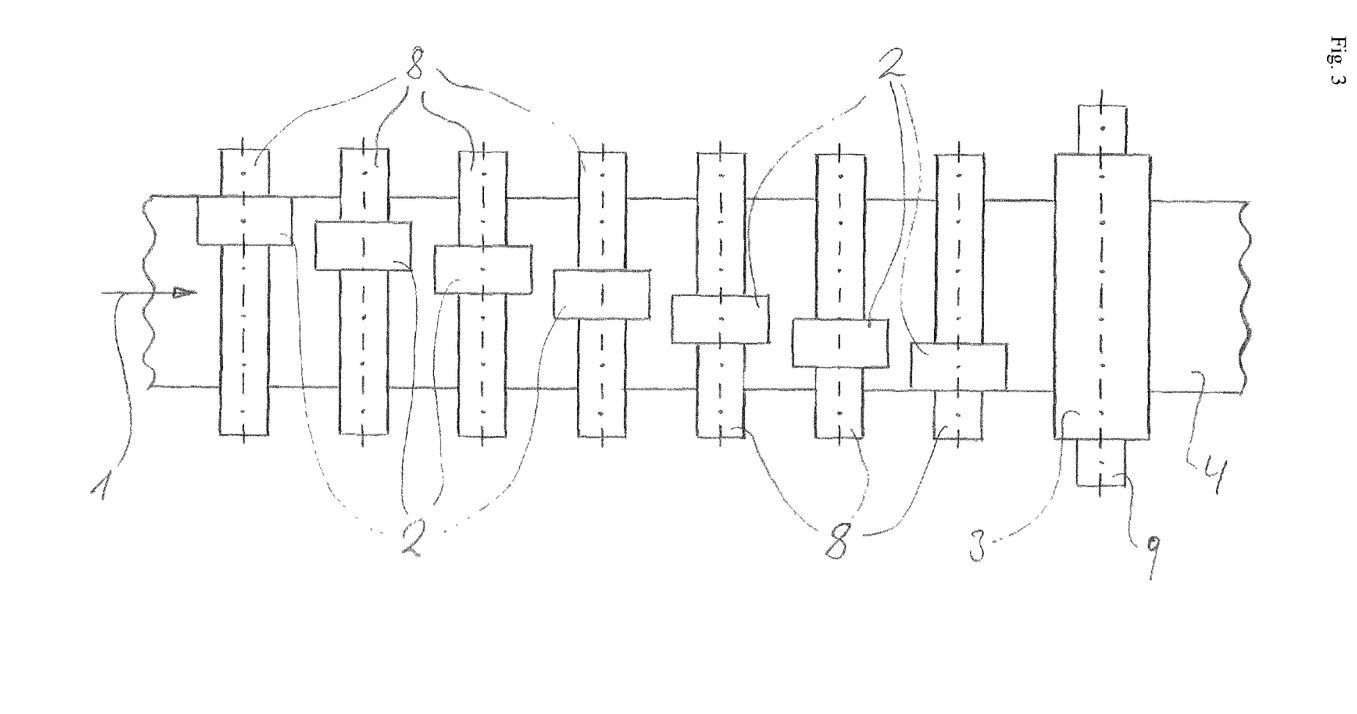
FIG. 3 plan view of a section of the inventive apparatus for producing a fiber-reinforced semifinished panel, wherein the sonotrodes are arranged in inclined alignment over the width of the tape/semifinished panel sheeting.
Figure 4:
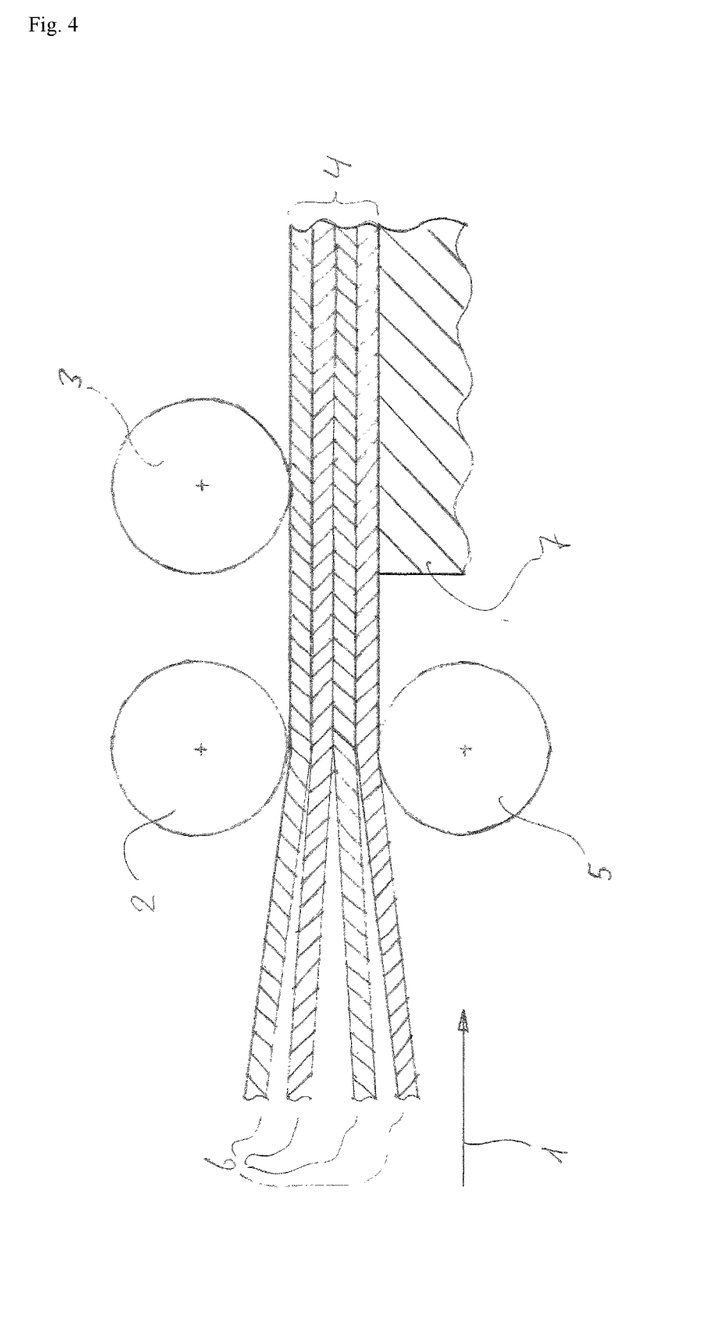
FIG. 4 side view of a section of the inventive apparatus for producing a fiber-reinforced semifinished panel.

The apparatus according to the invention is shown in exemplary and simplified form in FIGS. 1 to 4 without any intention to limit the invention to the embodiments depicted in these figures.

The reference numerals have the following meanings:
1 advancement direction
2 sonotrode(s)
3 pressing roller
4 fiber-reinforced semifinished panel sheeting
5 anvil wheel
6 tape(s)
7 support for fiber-reinforced semifinished panel sheeting
8 axis/axes of the sonotrode(s)
9 axis of the anvil roller

The invention claimed is:

1. A process for producing a fiber-reinforced semifinished panel comprising the following operations:
   (1) unrolling two or more unidirectionally fiber-reinforced semifinished products from rolls;
   (2) joining the two or more unidirectionally fiber-reinforced semifinished products to afford a fiber-reinforced semifinished panel sheeting by ultrasonic welding;
   (3) cutting the fiber-reinforced semifinished panel from the fiber-reinforced semifinished panel sheeting,
   wherein the two or more unidirectionally fiber-reinforced semifinished products are face to face superposed and are inseparably conjoined by ultrasonic welding;
   wherein the two or more unidirectionally fiber-reinforced semifinished products are conjoined to an extent of more than 99%, based on the surfaces with which they face each other;
   wherein the process is performed continuously; and
   wherein the alignment of the fibers of at least one of the two or more unidirectionally fiber-reinforced semifinished products is distinct from the alignment of the fibers of the other unidirectionally fiber-reinforced semifinished product or products.

2. The fiber-reinforced semifinished panel produced by the process according to claim 1.

3. A method comprising producing housing parts or housings or covers for IT devices, housings or housing parts of household appliances, or parts of automobiles or parts of aeroplanes utilizing the fiber-reinforced semifinished panel according to claim 2.

* * * * *